Jan. 16, 1968 A. TOURISON 3,363,486
CONTINUOUSLY-CENTRALIZED ADJUSTABLE BORING CUTTER
Filed June 5, 1967 2 Sheets-Sheet 1
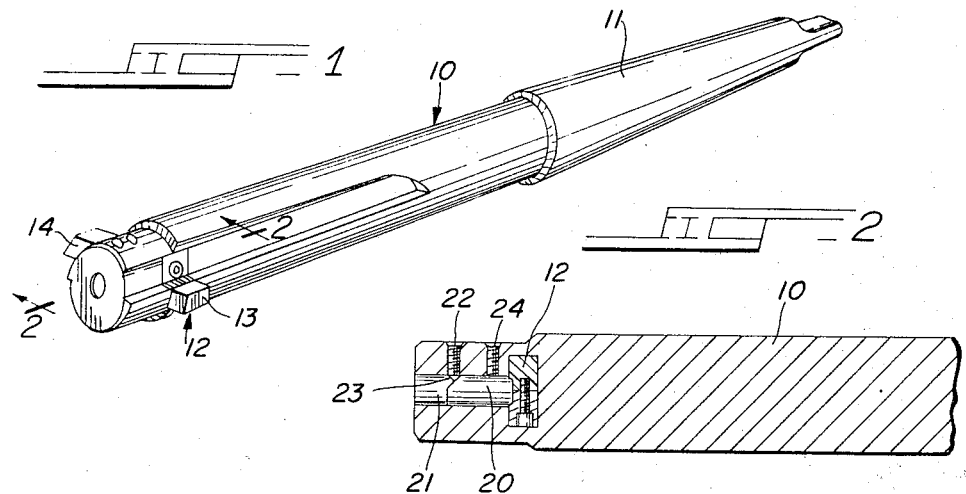
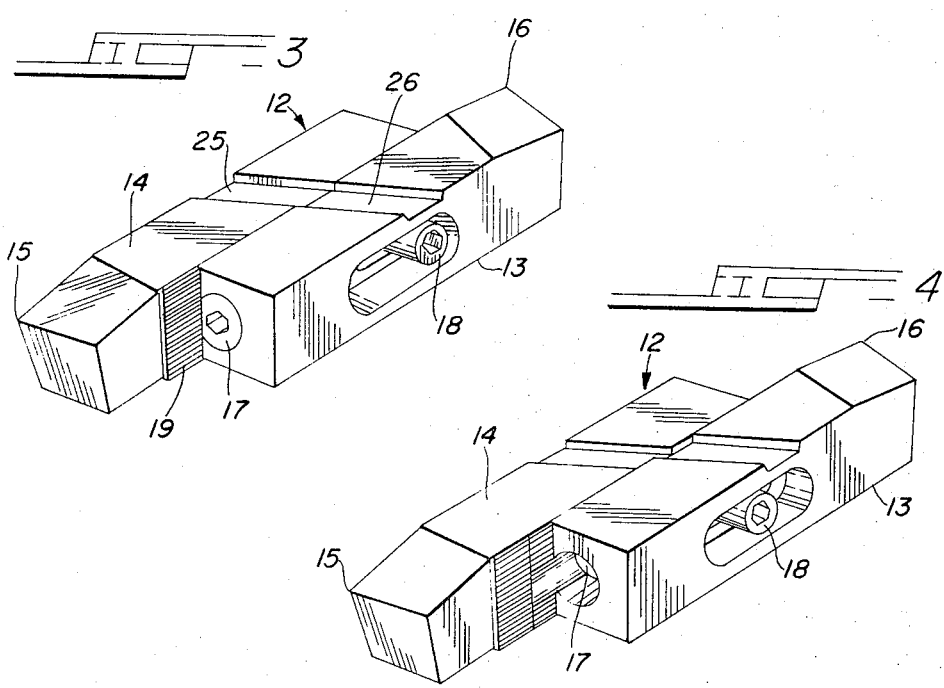
INVENTOR.
ASHER TOURISON
BY

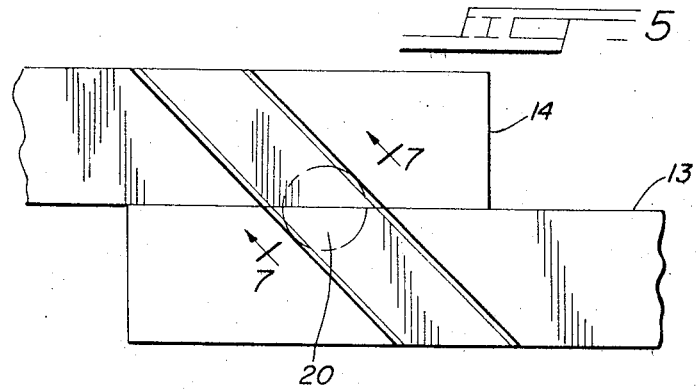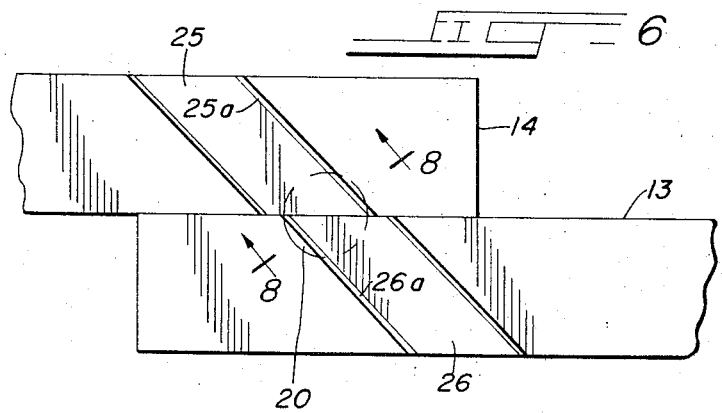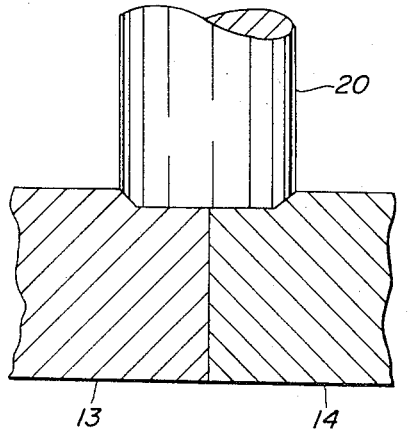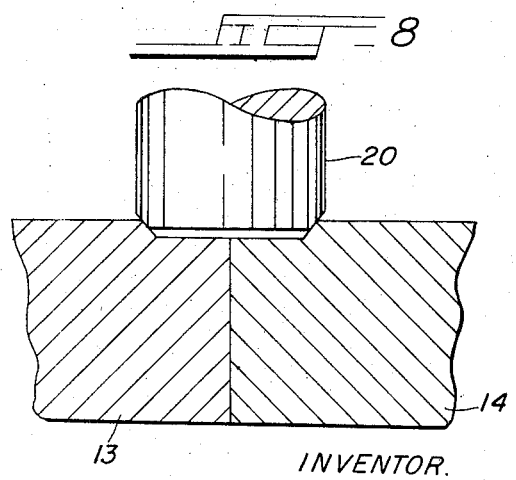
INVENTOR.
ASHER TOURISON

United States Patent Office 3,363,486
Patented Jan. 16, 1968

3,363,486
CONTINUOUSLY-CENTRALIZED ADJUSTABLE
BORING CUTTER
Asher Tourison, Grand Haven, Mich., assignor to
Muskegon Tool Industries, Inc., Muskegon, Mich.
Filed June 5, 1967, Ser. No. 643,485
4 Claims. (Cl. 77—58)

ABSTRACT OF THE DISCLOSURE

A system for centralizing an adjustable overlapped transverse cutting tool in a boring bar, wherein each of the cutting tool elements has a side groove inclined to the plane of separation of the elements for receiving the end of a locating pin, the grooves being at least partially in alignment.

Summary of the invention

It is common practice to design a boring tool with overlapped cutter elements extending in opposite directions, with the plane of overlap being close to the axis of a holding bar. This type of cutting tool has many advantages, many of which are due to the equalization of forces at the diametrically-opposite cutting points. The adjustment of the tool to varying diameters is commonly obtained through shifting the overlapped cutter elements along the interengaged surfaces so that the overall length between the cutting points is altered.

It has been common practice to centralize these tools in a holding bar through the action of a pin moving axially along the bar, and engaging aligned grooves in the sides of each of the overlapped cutter elements. This arrangement is very satisfactory in the initial installation of the cutter. If the diameter is to be altered, or if the cutter elements have to be extended to permit re-grinding, the result is to shift the locating grooves in the cutter elements somewhat out of alignment. This condition has often resulted in the necessity of re-grinding the locating grooves; or, in the alternative, accepting distortion of the walls of the grooves at the point where they are engaged by the locating pin. It has been common practice to arrange these grooves in a direction perpendicular to the plane of separation of the overlapped cutter elements, with the axis of the locating pin disposed substantially at this plane of separation. Even when the end of the locating pin is provided with an annular bevel, and the walls of the grooves are similarly inclined, the net effect of the displacement of the cutter elements is to cause the locating pin to engage the end of the groove wall in one cutter element, and the end of the opposite groove wall in the adjacent cutter element. This localized point bearing tends to deform the groove wall, and render the positioning of the cutter assembly somewhat less precise than is desired.

The present invention eliminates the point bearing at the end of the groove walls, and replaces this with an engagement of the pin at an area or point sufficiently set back from the end of the groove walls to eliminate the problem of deformation. This is accomplished by inclining the groove walls to the plane of separation of the cutter elements. The preferred form of the invention replaces an annular bevel at the end of the locating pin, which had been previous practice, with a taper defined by a pair of intersecting planes. These surfaces on the end of the pin have the characteristic of engaging the walls of the locating grooves over a substantial area, rather than with point or line bearing. Where the grooves are arranged perpendicularly to the plane of separation, as in the previous practice, it would have been impossible to utilize planar engaging surfaces on the pin, as the result would have been to produce a rotation of the pin under the forces involved, with consequent loss of locating precision, and also compounding the problem of distorting the groove walls. With the arrangement provided by this invention, the cutter elements can be progressively adjusted to increased diameter, with the locating pin continuing to engage one wall of the groove of one element, and an opposite wall of the groove in the adjacent element, with the configuration of the pin end and the groove wall such that the progressively narrowing distance is accommodated by a slight axial shifting of the pin.

Detailed description

The several features of the invention will be analyzed in detail through a discussion of the particular embodiment illustrated in the accompanying drawings. In the drawings:

FIGURE 1 is a perspective view of a complete boring tool incorporating the present invention.

FIGURE 2 is an axial section on a somewhat enlarged scale over that of FIGURE 1, showing the arrangement for centralizing the cutter assembly with respect to the axis of the holding bar.

FIGURE 3 is a perspective view on an enlarged scale of a cutter assembly as used in the FIGURE 1 device, in the initial condition.

FIGURE 4 is a perspective view of the same cutter assembly shown in FIGURE 3, with the cutter elements adjusted to an increased overall length.

FIGURE 5 and FIGURE 6 are schematic plan views showing the engagement of a locating pin with the cutting tool assembly in the conditions shown in FIGURES 3 and 4, respectively.

FIGURE 7 is a section on the plane 7—7 of FIGURE 5.

FIGURE 8 is a section on the plane 8—8 of FIGURE 6.

The boring tool illustrated in FIGURE 1 includes a holding bar 10 having a tapered end 11 for engagement with a suitable standard receiver in a boring machine. The cutter assembly 12 is received in a suitable transverse opening near the end of the holding bar 10, and includes the overlapped cutter elements 13 and 14. The plane of separation between these elements is disposed very close to the axis of the bar 10, in most installations. The overall length of the cutter assembly between the cutting points 15 and 16 is adjustable by manipulation of the screw 17, with a mechanism that forms no part of the present invention. The adjusted position of the cutter elements is normally secured by a conventional locking screw as shown at 18. To assure the continued alignment of the cutter elements 13 and 14 with respect to each other, it is preferable to serrate the interengaged surfaces as shown at 19. The term "plane of separation," as used herein, may be considered as a geometric plane intersecting the interengaged serrations at the half-way point in their depth.

The centralization of the cutter assembly 12 with respect to the axis of the bar 10 is accomplished by the pin 20 movable axially in the bore 21 under the action of the pointed end of the screw 22 acting against the slanted end surface 23 of the pin. The adjusted position of the pin is secured through the action of the locking screw 24. The tapered right-hand end of the pin 20 (as viewed in FIGURE 2) engages the walls of the groove 25 in the cutter element 14, and the groove 26 in the cutter element 13, in the manner shown in FIGURE 5, on the initial installation of the cutter assembly. If it becomes necessary to displace the cutter elements 13 and 14 along the plane of separation to increase the overall length between the points 15 and 16, a condition is produced such as is shown in FIGURE 6. With the axis of the locating pin 20 disposed on the plane of separation, the tapering end of the pin 20 will engage the wall 26a of the groove 26, and the wall 25a of the groove 25. Since the engagement of the pin 20 with the cutter elements 13 and 14 will be along opposite points or areas disposed or centering at positions considerably set back from the ends of the walls, there will be no distortion of the material of the cutter bits that define the ends of the walls at the plane of separation. In the preferred form of the invention, the walls are formed in a flared configuration in which the width of the grooves 25 and 26 is greater at the top of the grooves than at the base. This angular relationship is applied to the end of the locating pin 20 in the form of flat surfaces defined by intersecting planes disposed at the same relative angle as the planes defining the walls of the grooves 25 and 26. It is obvious that the axial position of the pin 20 in the FIGURE 5 condition will be slightly different from that in the FIGURE 8 position. The decrease in distance between the wall 26a and 25a is accommodated by a slight axial withdrawal of the pin 20, the new position being obtained and secured through the manipulation of the screws 22 and 24. If the end of the pin 20 is defined by an annular bevel, the result is somewhat less satisfactory, but still usable. The area contact provided by the planar surfaces defining the end taper of the pin 20 produces a substantial bearing area, while the annular bevel generates essentially a line contact along the wall of the groove from the base outward (similar to the element of a cone). While this line contact is inferior to the enlarged area of bearing, the fact that it is set back from the end of the walls of the grooves removes the possibility of such deformity at the ends of the grooves as to produce a problem.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A boring tool having a holding bar and a cutter including overlapped interengaged bits arranged transversely with respect to the axis of said bar, said bits being adjustable with respect to the overall length between the remote ends thereof, said bar having a locating pin movable axially with respect to said bar to a selected position to engage said cutter to centralize said cutter with respect to said axis, wherein the improvement comprises:

means on a side of each of said bits forming a groove disposed at an incline to the plane of separation of said bits, said grooves being in at least partial alignment, and disposed to receive the end of said pin.

2. A tool as defined in claim 1, wherein the end of said pin engaging said grooves is tapered to reduced transverse dimension at the said end.

3. A tool as defined in claim 2, wherein said taper is defined by intersecting planes.

4. A tool as defined in claim 1, wherein the said grooves are wider at the top than at the base thereof.

No references cited.

GERALD A. DOST, *Primary Examiner.*